May 18, 1965  M. O. GIERHART  3,183,803
APPARATUS FOR APPLYING SEALING MATERIAL
Filed Nov. 28, 1961  3 Sheets-Sheet 1

INVENTOR.
MELVIN O. GIERHART
BY Toulmin & Toulmin
ATTORNEYS

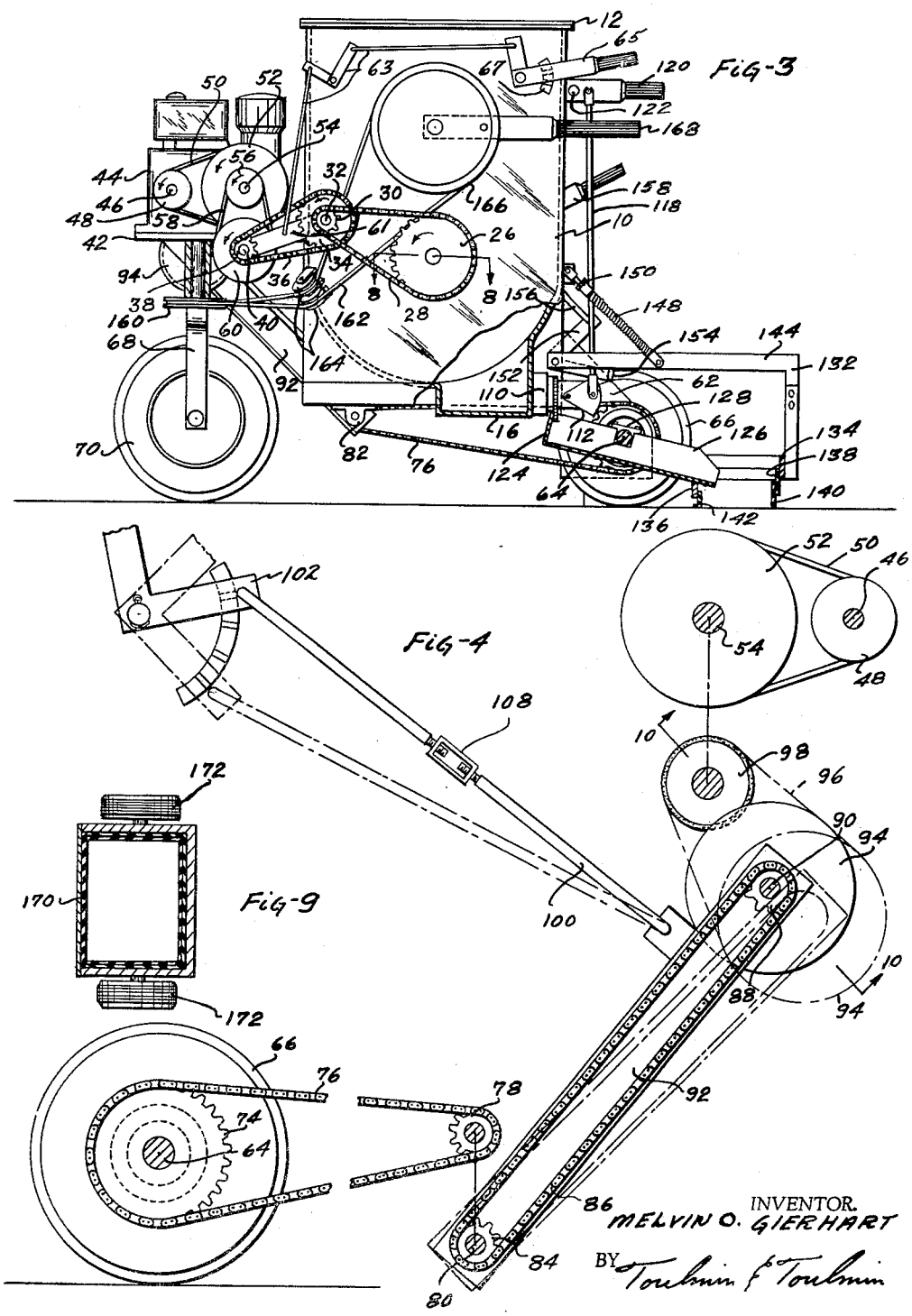

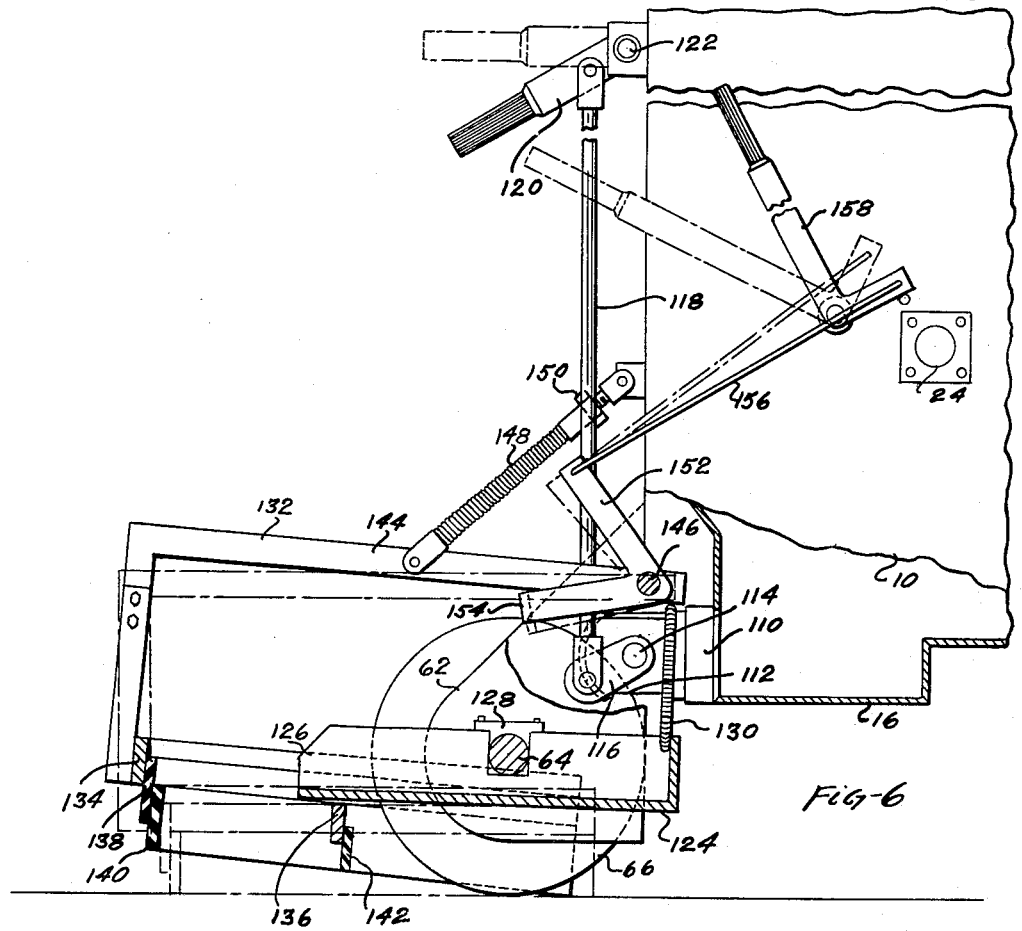
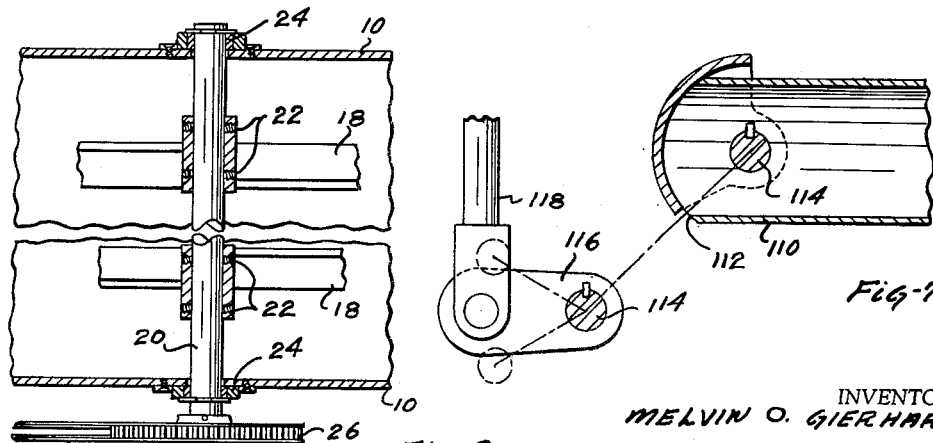

United States Patent Office 3,183,803
Patented May 18, 1965

3,183,803
APPARATUS FOR APPLYING SEALING
MATERIAL
Melvin O. Gierhart, P.O. Box G, Port Jefferson, Ohio
Filed Nov. 28, 1961, Ser. No. 155,283
2 Claims. (Cl. 94—44)

This invention relates to a method and apparatus for applying cold or hot flowable mixtures to surfaces such as roofs, pavements, floors, driveways, and the like.

More particularly still, the present invention relates to a method and apparatus for applying liquids and composition sealers and dressing materials to roofs, pavements, and the like, in which the material is simultaneously mixed and distributed in a single device.

Generally horizontal roofs and similar surfaces that must be sealed require initial application of a sealing liquid or a compounded mixture, and likewise periodic applications of such material is necessary for maintenance purposes. Similarly, pavement surfaces, particularly blacktop or asphalt pavements, are often subjected to a dressing material, particularly in connection with blacktop driveways, which have a tendency to become gray and molten and to become porous. These surfaces are dressed with a sealer material that seals the pores and at the same time imparts a good appearance to the pavement by making it uniform in color and somewhat glossy.

Heretofore, the application of sealing liquids and compounded mixtures of this nature was generally done by hand by the use of brushes or push broom-like spreaders, and while this provides for spreading of the material it is an exceedingly laborious operation and one in which there are very few controls.

The present invention proposes to overcome the drawback referred to above by providing in a single compact sealing driven mechanism a container for the material being dispensed and an arrangement for dispensing it, such that the aforementioned drawbacks are overcome.

This invention also proposes such an arrangement wherein control of the application of the material can be effected so that uniformly excellent results can be obtained.

This invention still further proposes the construction of a device for mixing and applying and distributing and controlling sealing liquids and sealing compounded mixtures such that the device is manipulable, so that complete coverage of any area can be had even when the area is relatively complex in configuration.

It is further proposed that a device according to the present invention will be as readily applicable to large surfaces as it is to small, and that it will be easily transportable and simple to operate.

The several objectives of the present invention referred to above, as well as other objectives and advantages of the invention, will become apparent from the following detailed specification and the accompanying drawings wherein:

FIGURE 3 is a view like FIGURE 1 but looking into the other side of the machine;

FIGURE 4 is a diagrammatic view showing the drive from the engine output shaft to the drive wheels of the vehicle and the control therefor;

FIGURE 6 is a fragmentary view, drawn in somewhat enlarged scale, showing the sump at the bottom of the mixing tank and the discharge from the sump and the tiltable tray to which the material is discharged from the sump and from which tray the material is delivered to a distributing box;

FIGURE 7 is a diagrammatic view showing the gate valve associated with the sump which is adjustable for controlling the delivery of material from the sump to the tray;

FIGURE 8 is a fragmentary sectional view indicated by line 8—8 on FIGURE 3 showing the manner in which the agitators are connected with the agitator shaft and also showing how the agitator shaft is journalled in the mixing chamber and driven;

FIGURE 9 is a rather diagrammatic view showing a modified arrangement which the distributing box can take.

General arrangement

The device of the present invention comprises, generally, a hopper or chamber adapted for receiving sealing material, such as a liquid or semi-liquid asphalt mixture, and in which hopper or chamber the material can be transported, either by movement of the device on its own wheels, or by carrying the device on a truck.

The apparatus according to this invention includes mixing means in the hopper or chamber for admixing the material therein, and associated with the hopper is a sump to which the mixed material flows, and a valve is provided to control the discharge of material from the sump. A distributing control box receives the material from the sump and this control box rides on or is closely adjacent the surface being treated and distributes the material over the surface and controls the application of the material.

The apparatus or device carries a drive motor by means of which mixer-agitators are driven, and by means of which the drive wheels of the vehicle are driven, so that it can be moved about on a truck or on a paved surface, such as a driveway.

Structural arrangement

A preferred embodiment of my invention is illustrated in the accompanying drawings wherein the hopper is indicated at 10, and which hopper may be provided with a detachable lid 12, if so desired. This might be useful where the agitating was severe and there might be some splashing of the mixture, or it might be employed where heated material is placed in the hopper in order to prevent loss of heat.

The hopper has a substantial capacity so that sufficient material for a relatively large driveway, for example, could be placed therein and the complete job of coating and sealing could be done at one time.

Figure 2:
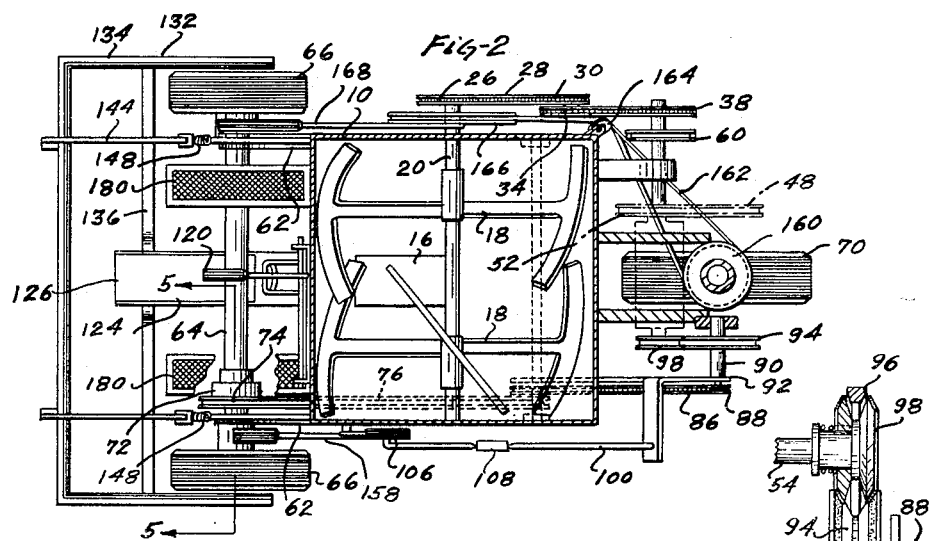
FIGURE 2 is a plan view thereof.

The hopper 10 has a rounded bottom 14 which includes a sump portion 16, best seen in FIGURES 2, 3, and 6. The material in the hopper is maintained admixed, or the several ingredients of the mixture can be placed in the hopper and mixed therein by rotary agitator elements 18, best seen in FIGURE 2, which are mounted on a shaft 20, fixed thereto by set screws 22, (FIGURE 8) or by keys or the like. Shaft 20 is journalled in the side walls of the hopper by bearings 24 and at one end carries a sprocket wheel 26 that is drivingly engaged by a drive chain 28.

As will be seen in FIGURE 3, drive chain 28 passes about a sprocket 30 on a stub shaft 32 carried on the side wall of the hopper, and which shaft also has thereon a sprocket 34 engaged by a chain 36 that passes about another sprocket 38 on a transversely extending jack shaft 40 which extends laterally across in front of hopper 10, being suitable supported in bearing means for free rotation.

Immediately above shaft 40 is a motor platform 42 that carries an internal combustion engine 44. Engine 44 has an output shaft 46 driving a pulley 48 which drives, by way of a V-belt or the like at 50, a larger pulley 52 on another jack shaft 54. On the end of shaft 54, as seen in FIGURE 3, there is a pulley 56 which drives, by way of a belt or the like, pulley 60 against the jack shaft 40.

It will be apparent that engine 44 is thus connected for driving the agitator members in rotation when the motor operates.

The hopper 10 has support plates 62 attached thereto and extending rearwardly and downwardly and being connected with axle structure 64 of rear drive wheels 66 of the apparatus. The forward end of the hopper is attached to motor support plates 42 and this support plate, in turn, rests on the pivoting supporting structure 68 for the steerable front wheel 70. The hopper and the drive engine are thus supported for mobility on the driven rear wheels and the steerable front wheel.

Figures 5, 10:
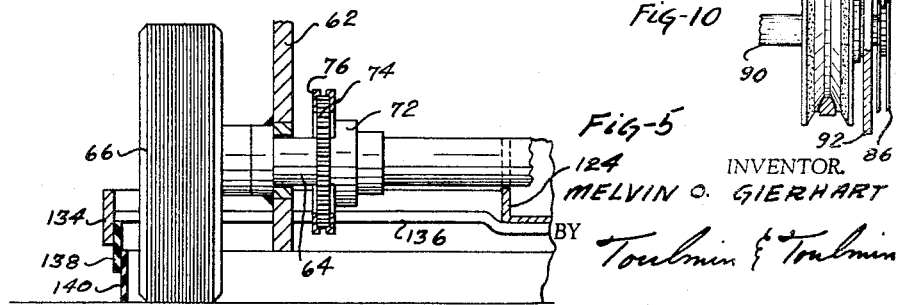
FIGURE 5 is a section view indicated by line 5—5 on FIGURE 2 showing the drive into the wheels of the vehicle and a differential unit included in the drive.
FIGURE 10 is a view showing a pulley arrangement in connection with the drive from the engine to the wheels.

With respect to the driving of the rear wheels, as will as seen in FIGURE 5, the rear axle structure comprises a differential unit 72, and there is a sprocket 74 for driving the differential, thereby to drive the drivable rear wheels through the axle structure 64.

Figure 1:
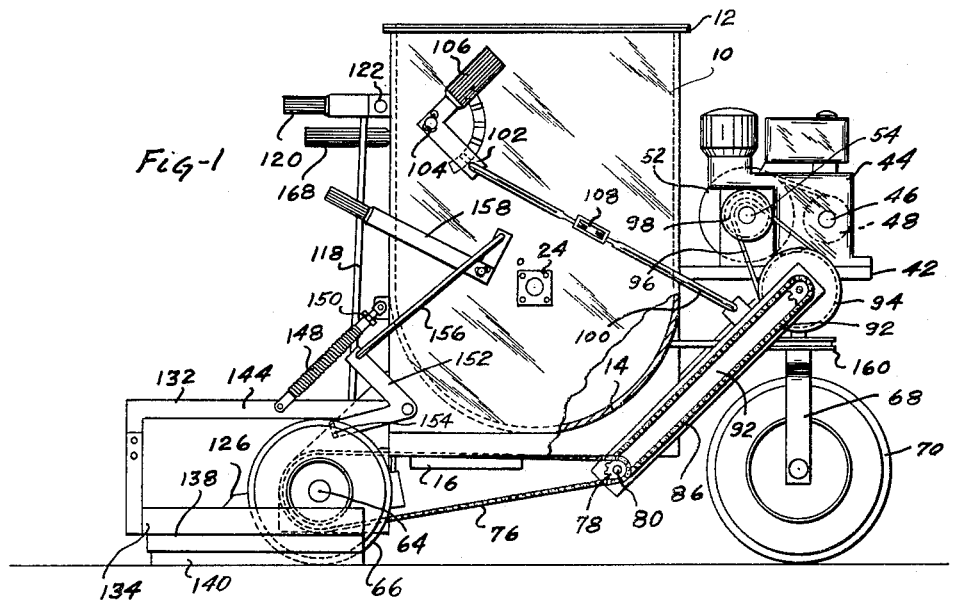
FIGURE 1 is a side view of a mixer-distributor according to my invention.

A chain 76 passes about sprocket 74 and leads forwardly therefrom, as will be seen in FIGURE 1. This chain at its forward end passes about a sprocket 78 on a shaft 80 that is supported on bearings 82 (FIGURE 3) secured to the underside of the hopper structure.

Shaft 80 carries a second sprocket 84, best seen in FIGURES 2 and 4, which is driven by a chain 86 that passes about a sprocket 88 mounted on a shaft 90 that is rotatably mounted in the upper end of an arm 92, the lower end of which is pivoted to shaft 80 on which sprockets 78 and 84 are mounted.

Also carried on shaft 90 is a pulley 94 connected by drive belt 96 with a pulley 98 mounted on the end of jack shaft 54, which is visible in FIGURE 1. The arm 92 has connected thereto a link 100 which at its other end is connected with the lever arm 102 pivoted to the hopper structure 104. A handle 106 is connected with the lever arm so that it can be moved into various positions. A means is provided for latching the lever in its various positions as indicated by the arcuate member 103 which may be an undulating spring or the like. The lever arm and handle have four operative positions.

In the neutral position, the belt 96 falls slack and there is no driving connection from pulley 98 to pulley 94. The lever can be moved to its reverse position in which case the pulleys themselves come into direct driving contact and this provides for reverse rotation of pulley 94. This is accomplished by forming pulley 94 so that the V is quite wide and whereby it can actually receive within the V the periphery of pulley 98 which is formed with outwardly facing surfaces divergent toward the center of rotation of the pulley for engagement with the groove of pulley 94.

According to this invention, pulley 98 is of the split type which means that the two halves of the V are on separate members and these members are spring urged toward each other so that by tightening the belt, the two parts of split pulley 98 can be caused to move apart and the belt will then move toward the center of the pulley and increase the drive ratio between pulley 98 and pulley 94. With this in mind, lever arm 102 has at least two other positions, a first forward driving position where belt 96 is drawn tight enough to drive but not tight enough to separate the sides of pulley 98 in which position the drive ratio between pulleys 98 and 94 is at its lowest value.

By moving lever 102 forward, clockwise, about its pivotal support, however, the belt 96 can be caused to force the two sides of pulley 98 apart and increase the drive ratio between pulleys 98 and 94 thereby reducing the speed of movement of the machine. It will be understood that there could be provided between the high forward drive and low forward drive, as many intermediate drive positions as desired.

The link 100 may advantageously include a turn buckle 108 for the adjustment of the length of link 100.

The material that is admixed in the hopper and delivered to the sump 16 thereof is eventually delivered to a distributor box at the rear of the apparatus. This is accomplished by providing the sump with an outlet passage means 110 closed at the rear end by an arcuate valve gate 112 and is mounted as on a shaft 114.

The valve gate is adapted for adjustment into any position between completely closed and completely open by an arm 116 attached to shaft 114 that has pivoted to its outer end a rod 118 which in turn is pivoted at its upper end to an arm 120 pivotally supported at 122 on the hopper. It will be evident that the arm 120 can be adjusted to effect any desired degree of opening of valve gate 112.

Positioned beneath the outlet opening so that material released therefrom by opening of the valve gate will drop thereon, is a tray 124 having a bottom and three sides but open at the back 126. This tray is pivotally supported by bearing means 128 on the rear wheel axle structure 64.

Springs 130 connected between the closed end of the tray and the hopper structure bias the closed end of the tray upwardly and which will, of course, tend to tilt the tray in a direction to open the lower end. The tray structure and springs, and the control for the valve gate referred to, will be best seen in FIGURE 6.

The tray 124, as will be seen in FIGURES 2 and 6, is located in the center of a distributor box 132, which is a generally U-shaped steel frame member 134, having one part extending transversely behind wheel 66 and its two arms extending forwardly along the outside of the wheels. This frame preferably has a transverse bar 136 therein on which the open end of tray 124 rests. This is provided for stiffening the distributor box, and is also so located that when the distributor box is elevated the tray at the open end is also elevated.

The distributor box, as will be seen in FIGURE 6, is a thick rubber strip 138. Extending thereabout and on the inside of this strip in a partially overlapping position is a second rubber-like strip 140.

There may also be provided a rubber-like strip at 142 on the transverse member 136. This rubber stripping, when the distributor box is lowered, engages the surface being treated and also defines an enclosure to which the material being applied to the surface is delivered.

Movement of the apparatus over the surface will then distribute the material thereover, while at the same time the rubber strips spread the material and make the coating uniform and tend to squeegee the material into the pores of the surface; whereby an end result is obtained that is superior not only as to penetration of the sealing material but as well as to uniformity of distribution and finish.

The aforementioned distributor box is fixed to a frame-like support 144 that extends forwardly and is pivoted on a shaft 146 extending transversely at the back of the hopper structure and supported thereon. Extending diagonally between the hopper structure and the support frame 144 is collapsible link means 148 that include screw thread adjusting means 150. This link means biases the support frame and the distributor box downwardly towards the surface to be treated, and the degree of the bias is controllable by adjustment of the screw thread means 150.

Lifting arms means 152 are also pivotally supported on shaft 146 and include a first arm means 154 abuttingly engaging beneath the support frame 144. Another arm means is connected by rod 156 with a manually movable lever 158. Lever 158 when in its full line position (FIGURE 6) elevates the distributor box as illustrated; but when the arm 158 is moved to its dot-dash outline position (FIGURE 6) the distributor box is lowered to engage the surface, as is also indicated in dot-dash outline position in FIGURE 6. This lowering movement of the distributor box will be accompanied by downward tilting of the open end of tray 124, so that opening of valve gate 112 material will flow from the sump of the hopper to the outlet to the tray and thence into the distributor box.

The front wheel 70, as has been mentioned, is supported on the pivotal supporting structure 68, which is arranged somewhat like a bicycle, and which structure carries a steering pulley 160 about which passes a belt 162. This belt is guided over angle pulley means 164 carried on the hopper structure and then extends upwardly and about a relatively large pulley 166 rotatably carried by the hopper structure. This last mentioned pulley has a lever arm 168 attached thereto, which can be availed of for turning pulley 166, which through belt 162 will drive pulley 169, thereby to rotate the steerable front wheel 70.

It will be appreciated that the front wheel is freely rotatable through a full 180° so that the apparatus is extremely flexible with regard to manipulation with the forward and reverse drive arrangement and the wide degree of pivoting the steerable front wheel, even the most complex surface contours can be covered quite adequately.

The distributor box described and illustrated has its arms extending on the outside of the driven rear wheels, but it will be evident that the rear wheels could be positioned upwardly of the distributor box, as illustrated in FIGURE 9. In this figure the distributor box is indicated at 170 and the rear wheels of the apparatus are indicated at 172. In this modification the distributor box could be made as large as desired, and the only drawback being that the rear wheels would not be so disposed that material would be spread and the weight thereof might erase all wheel prints on the surface being coated.

In operating the apparatus, the operator stands on the platform 180 located toward the bottom of the hopper and at the rear of the apparatus. From this position, all of the levers can be readily manipulated and the operator can, at the same time, observe the operating conditions, including the amount of material in the distributor box and the manner in which it is flowing out onto the surface being treated.

In connection with the drive previously described for driving the agitator, I find it advantageous to utilize a split pulley at 56 which is similar in construction to split pulley 58 previously referred to in connection with the wheel drive. The pulley 60 driven by belt 58 from pulley 56 is then mounted on an arm 61 which is swingable about the center of shaft 32. A linkage system 63 connects this arm with a lever 65 mounted on the side of the hopper and positioned close to the operator. This lever is movable into a plurality of positions, which may be determined by the undulating spring detent or the like at 67 so that any desired drive ratio, within the limits of variability of split spring pulley 56, can be achieved.

This arrangement also permits movement of pulley 60 to a position where belt 58 falls slack so that the agitator is stationary.

While the device illustrated is capable at any time of distributing a cold mix, and can be employed for distributing a hot mix when the mix is delivered to the hopper in a heated condition, it will be obvious that heating means, such as oil or gasoline burners, could be provided for heating the hopper to maintain the material therein at an elevated temperature, if so desired.

It will be understood that this invention is susceptible to modification in order to adapt it to different usages and conditions and, accordingly, it is desired to comprehend such modifications within this invention as may fall within the scope of the appended claims.

What is claimed is:

1. A compact self-contained apparatus for mixing and distributing flowable material, such as sealing or dressing material for roofs, pavement areas, and the like, comprising; a hopper open at the top, rear wheels carried by the hopper at the back and supporting the hopper, steerable front wheel means rotatable on a vertical axis through substantially 180 degrees and carried by the hopper at the front, agitator means in the hopper for mixing material therein, a shaft extending transversely through the hopper supporting said agitator means, the bottom of said hopper being rounded to conform with the path of movement of the agitator means therein, a sump in the bottom of the hopper toward the back, a distributing box pivotally mounted on the hopper and extending rearwardly therefrom and comprising resilient strip means about the bottom for yieldable engagement with a surface being treated, an outlet from said sump, a gate valve controlling said outlet, a tray having its front end beneath said outlet and its rear end disposed above said distributing box for conveying material from said outlet to the distributing box, said distributor box having arms extending forwardly from the sides thereof on the outside of said rear wheels, means for raising and lowering said distributing box, an engine carried by the hopper, means drivingly connecting said engine with said agitator means and with said rear wheels and including control means for selectively interrupting and reversing the driving connection between said engine and said rear wheels, platform means at the rear of the hopper for supporting the operator of the apparatus, and control levels carried by the hopper adjacent the operator for controlling said steerable front wheel means and said control means and the means for raising and lowering said distributing box.

2. A compact self-contained apparatus for mixing and distributing flowable material, such as sealing or dressing material for roofs, pavement areas, and the like, comprising; a hopper of greater height than width or length adapted for receiving material to be distributed and having mixing means therein, a steerable front wheel closely adjacent to the hopper in the front, rear wheels and a rear axle drivingly supporting said rear wheels, means for supporting said hopper on said front wheel and said rear wheels, a valved discharge opening in the bottom of the hopper at the back thereof, a support shaft secured to the rear of the hopper and a distributor box having one end pivotally mounted thereon, adjustable link means between said box and said hopper biasing said distributor box downwardly towards the surface to be treated, link means pivotally mounted on said support shaft and adapted to raise and lower said distributor box to engage the areas to be treated, said distributor box having resilient strip means about the bottom for yieldable engagement with the areas being treated, a tray pivotally mounted on said rear axle having its front end beneath said valved discharge opening and its rear end disposed above said box for conveying material from said opening to said box, spring means secured to the forward end of said tray and said hopper to bias said forward end towards said hopper, an engine carried by said hopper above said front wheel, means drivingly connecting said engine with said mixing means, and with said rear wheels and including control means for selectively interrupting and reversing the driving connection between said engine and said rear wheels, platform means at the rear of the hopper for supporting the operator of the apparatus, and control levers carried by the hopper adjacent the operator for controlling said steerable front wheel and said link means for pivotally moving said box for yieldable engagement with the area being treated, said distributor box having a transverse member upon which the rear end of said tray rests whereby raising of said box will also tilt the tray about its pivotal support and interrupt the movement of material from said discharge opening to said distributor box.

References Cited by the Examiner
UNITED STATES PATENTS

| | | | |
|---|---|---|---|
| 832,636 | 10/06 | Switzer | 74—203 |
| 1,652,434 | 12/27 | George | 94—46 |
| 1,755,653 | 4/30 | Koehring | 94—46 |
| 1,901,297 | 3/33 | Hurt | 94—44 |
| 2,267,978 | 12/41 | Ionides | 94—40 |
| 2,271,333 | 1/42 | Farrell | 94—46 |
| 2,578,080 | 12/51 | Middestadt | 94—39 |
| 2,918,133 | 12/59 | Ericsson | 74—203 |
| 2,956,486 | 10/60 | Siegle | 94—44 |
| 3,044,568 | 7/62 | Bookman | 74—203 |
| 3,070,822 | 1/62 | Lipkins | 94—44 X |
| 3,130,652 | 4/64 | Newton | 94—46 X |

FOREIGN PATENTS

| | | |
|---|---|---|
| 238,679 | 8/25 | Great Britain. |
| 240,544 | 10/25 | Great Britain. |
| 445,615 | 4/36 | Great Britain. |

JACOB L. NACKENOFF, *Primary Examiner.*
HENRY SUTHERLAND, *Examiner.*